(12) United States Patent
Miller et al.

(10) Patent No.: US 8,401,584 B2
(45) Date of Patent: Mar. 19, 2013

(54) DYNAMIC GROUP PRIORITIZATION IN COMMUNICATION NETWORKS

(75) Inventors: Trent J. Miller, West Chicago, IL (US); Jeff S. Anderson, Itasca, IL (US); Michelle M. Antonelli, Barrington, IL (US); Ronald T. Crocker, St. Charles, IL (US); Steven E. Vanswol, Lombard, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1073 days.

(21) Appl. No.: 12/140,557

(22) Filed: Jun. 17, 2008

(65) Prior Publication Data

US 2009/0312045 A1    Dec. 17, 2009

(51) Int. Cl.
*H04B 7/00* (2006.01)
(52) U.S. Cl. ..................................... 455/519; 455/521
(58) Field of Classification Search .............. 455/517, 455/518, 519, 521
See application file for complete search history.

(56) References Cited

U.S. PATENT DOCUMENTS

| | | | |
|---|---|---|---|
| 6,295,284 B1 | 9/2001 | Maggenti | |
| 7,702,347 B1 * | 4/2010 | Vu ............................... | 455/518 |
| 7,711,383 B2 * | 5/2010 | Namm et al. .................. | 455/519 |
| 2004/0005904 A1 | 1/2004 | Wolf | |
| 2006/0003784 A1 * | 1/2006 | Chion et al. ................... | 455/518 |
| 2006/0250648 A1 | 11/2006 | Silverbrook et al. | |
| 2006/0256719 A1 | 11/2006 | Hsu et al. | |
| 2006/0262922 A1 | 11/2006 | Margulies et al. | |
| 2008/0003942 A1 | 1/2008 | Namm | |

FOREIGN PATENT DOCUMENTS

| | | |
|---|---|---|
| KR | 100741324 | 7/2007 |
| WO | 2004028112 A1 | 4/2004 |

OTHER PUBLICATIONS

Blake, S. et al.: An Architecture for Differentiated Services, Network Working Group Request for Comments: 2475 Category: Informational, RFC 2475, Copyright the Internet Society Dec. 1998, pp. 1-36.
Shared Group XDM Specification Candidate Version 1.0—Jul. 24, 2007, Open Mobile Alliance, OMA-TS-XDM_Shared_Group-V1_0-20070724-C, 2007 Open Mobile Alliance Ltd., pp. 1-39.
PCT Search Report Dated Dec. 23, 2009.
International Preliminary Report on Patentability for counterpart International Application No. PCT/US2009/045567 dated Dec. 18, 2010.
English language translation of KIPO'S Notice of Preliminary Rejection mailed on Jan. 30, 2012 for counterpart Korean Patent Application No. 10-2010-7028365.

* cited by examiner

*Primary Examiner* — Nguyen Vo
(74) *Attorney, Agent, or Firm* — Brian M. Mancini; Steven A. May

(57) ABSTRACT

An apparatus and method for dynamic group prioritization in a communication network includes a first step (400) of defining a dynamic list of group participants by an application, such as a dispatch function. A next step (402) includes sending a request to a Group Management Function, wherein the request includes a requested group priority and the list of group participants. A next step (404) includes allocating a unique identifier to the group and assigning a group priority to the group. A next step (406) includes notifying the application, group participants, and network of the unique identifier and the network of the assigned group priority. The assigned priority of the group and its flows can be dynamically altered in real-time while the group is active.

16 Claims, 4 Drawing Sheets

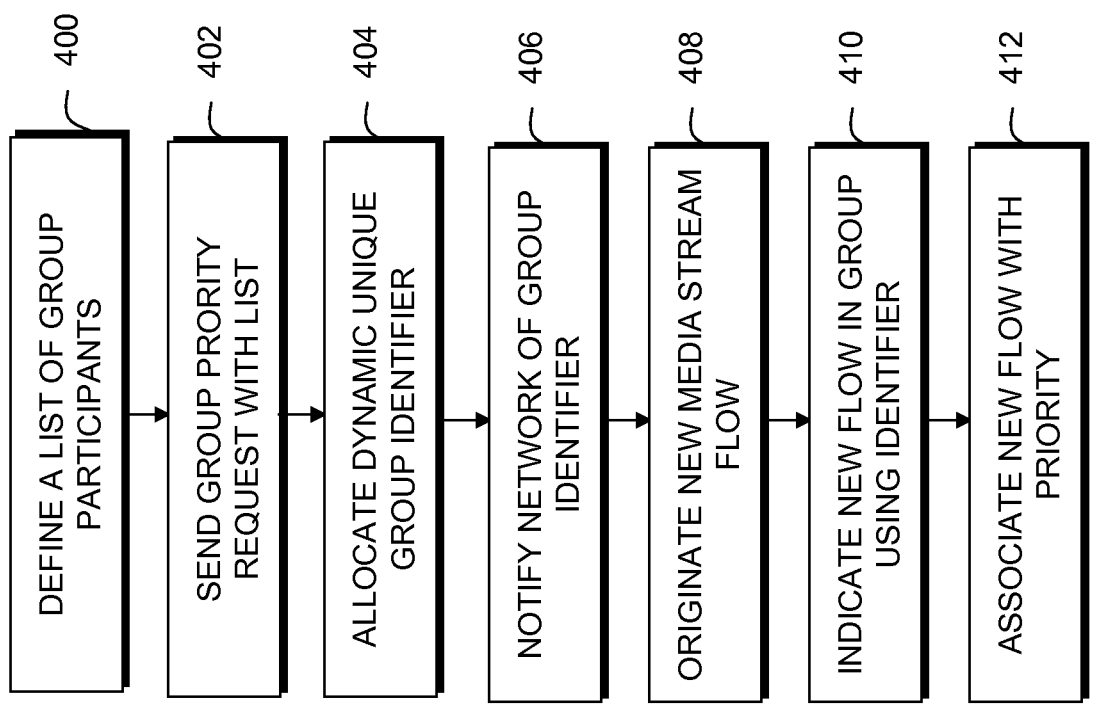

DYNAMIC GROUP PRIORITIZATION IN COMMUNICATION NETWORKS

FIELD OF THE INVENTION

This invention relates to wired and wireless communication networks, in particular, to a mechanism for dynamic group prioritization in a communication network.

BACKGROUND OF THE INVENTION

Today's Access Networks (ANs) are designed primarily for individual usage. Usage examples include: an Intranet/Internet user 'surfing the web', an business user using corporate email, a user of a public cellular network making a Telephony call, or a user of a private system making a one-to-one private push-to-talk (PTT) call. The ANs that serve these individuals typically prioritize each user individually with respect to network resources, and the prioritization is made statically (i.e. the user's prioritization does not normally change during a session). For example in 3GPP R8 LTE, individual users are prioritized statically in the Home Subscriber Server (HSS). Changes to a user's priority are typically initiated by the system administrator (e.g. in response to a subscription change).

Within today's Access Networks (i.e. wired and wireless networks), group services, such as 'chat', 'instant messaging', 'conference bridges', and 'group push-to-talk', are increasing in popularity. Group services (i.e. one or more users sharing one or more applications) are growing in number. Several problems arise when individual network prioritization is used with group services: media streams associated with one or more group members using a group service may become unreliable or unintelligible (e.g. a broken audio stream in a VoIP conference), one or more members may be dropped from an in-progress group service (e.g. a user falls out of a group push-to-talk call), a lower priority individual user may not to be able to join an in-progress group service (e.g. a person can't get network resources to be able to join a wireless instant messaging service).

Previous methods of access network resource prioritization are insufficient for group applications, inasmuch as group applications (and all associated individuals) must be able to adapt their priority level at once. Various use cases exist that demonstrate how a group service can over time change scope and priority, and that prior art techniques are not sufficient to address these needs.

In a first case, subscription based HSS/HLR/AAA Provisioning simply provides static provisioning of a user as a high priority or 'gold' user, but doesn't account for the dynamic priority nature of a group application, e.g. the 'gold' user (sharing a commercial wireless network) is part of a taxi group dispatch service, and after an accident, the 'gold' user needs to signal that the group is in a state of emergency and should receive elevated AN priority.

In a second case, service-based application prioritization can prioritize all flows associated with one application above all other flows from another application. However, this is insufficient because a group session will likely use many applications, e.g. a professor may administer an online lecture while using a VoIP conference and an application sharing program. Because the group session involves multiple applications, individual application prioritization is insufficient (i.e. the entire group session is useless if only one application is received by students). This example further illustrates that applications can be combined in a group communications environment and that priority should be given to the overall task or group.

Accordingly, what is needed is a technique to allow network priority to be applied dynamically to a group of users (i.e. priority for the group of users can be changed mid-call or mid-session). It would also be of benefit to dynamically assign users to groups by application

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 4 shows a flow chart illustrating a method, in accordance with the present invention.

Skilled artisans will appreciate that common but well-understood elements that are useful or necessary in a commercially feasible embodiment are typically not depicted or described in order to facilitate a less obstructed view of these various embodiments of the present invention.

DESCRIPTION OF THE PREFERRED EMBODIMENTS

The present invention provides a technique to dynamically assign users to groups by application/service, and to manage the group of users with a dynamic priority setting for that group and particular media streams or flows from members or applications associated with that group. In particular, from the network (e.g. Access Network (AN) or Radio Access Network (RAN)), the present invention identifies a group of users and dynamically associates a priority with the group and its flows that spans applications/services and overrides a pre-provisioned priority of each "user", defined herein as a subscriber and/or subscriber device. The present invention, also dynamically changes the priority of the group after an initial priority has been assigned, and associates all flows for the group with the group priority. These techniques allow the network to determine which flows should be prioritized and sometimes pre-empted in a multi-application environment. This invention is especially useful for shared networks which have both public (e.g. commercial) and private (e.g. enterprise) users.

In particular, users are dynamically assigned to groups by one or more applications. In other words, a group priority is associated with the group of users and a flow priority is assigned in the network for flows for the users, and these priorities can change during the group's life. Within a group, there can be media streams from multiple applications. Rather than relying on the priority of any one application, the group and all its associated media streams is given a group priority. This is critical for important or emergency applications (e.g. voice, video, and data). It should be noted that this invention still allows varied media stream priorities within the group (i.e. some streams, like voice, could be more important than video). Ultimately, media streams from groups are mapped to network flows. All flows associated with the group are treated according to the flow's priority, which is defined by the group's priority and any relative priority of the flow within the group.

Figure 1:
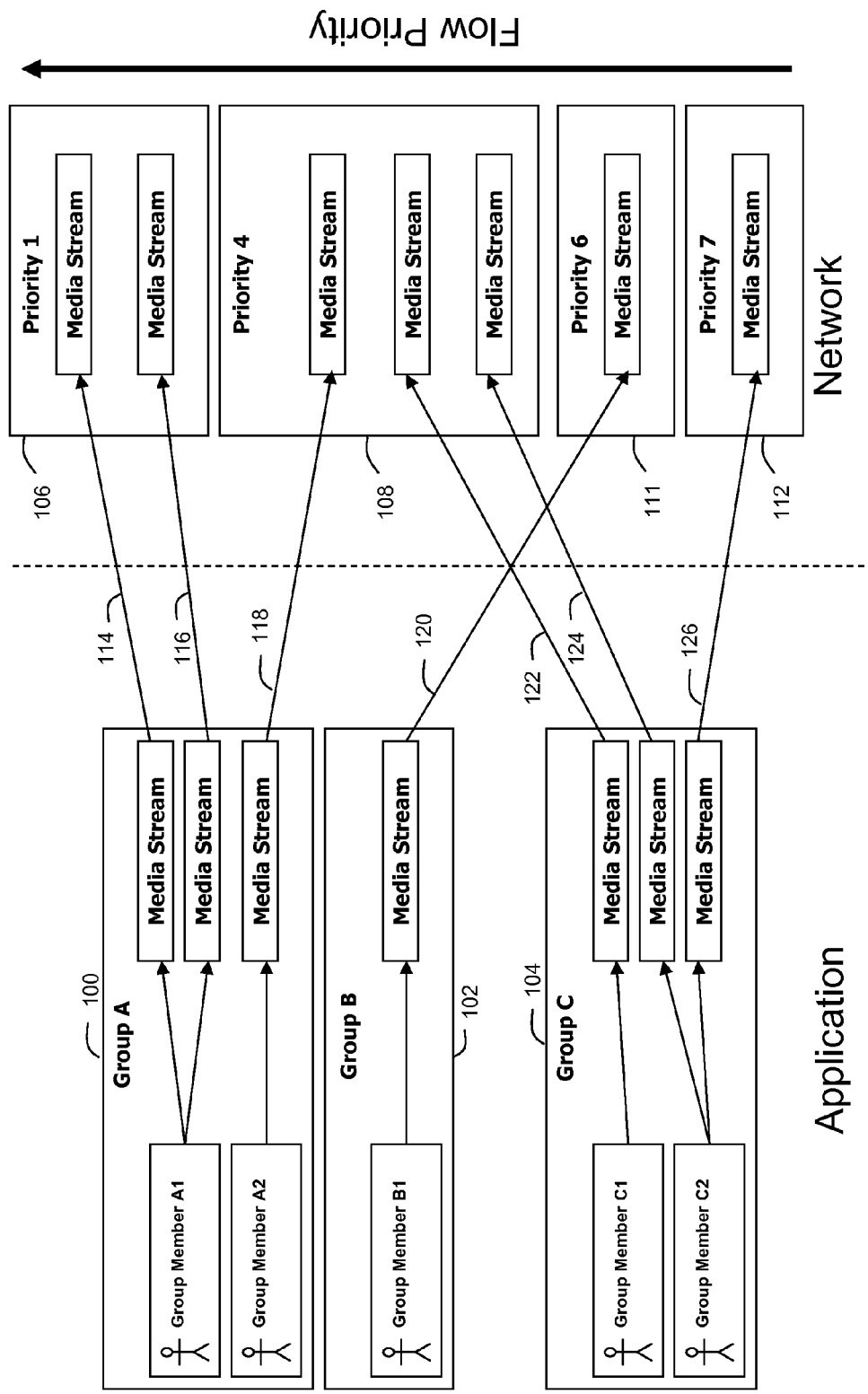
FIG. 1 shows an illustration of group priority flows before a priority change, in accordance with the present invention.

Referring to FIG. 1, three groups are shown using a shared public network, a critical use group 100 that includes emergency services such as a critical use group 100 that includes utility workers responding to downed power lines police, fire, and ambulance, that are reacting to an emergency situation, i.e. critical use. This group is always accorded the highest group priority. A second group 102 also consists of the same critical use group, however, in this case the critical use groups are not in an emergency situation, i.e. non-critical use. Therefore, this group 102 is assigned a lower group priority than other critical use groups that are reacting to an emergency situation. There are other normal telephony users of the shared public network, one of which 104 is shown as a subscriber to premium (gold) telephony services. These premium subscribers may (as shown) or may not be accorded a higher priority over the second group 102, depending upon the network operator preferences.

The group members of the first group 100 are all assigned a group priority by the network. In addition, each media stream from these group members is assigned a flow priority. For example, the first group member A1 is shown having two media streams 114, 116, such as voice and data for example. In this case, both of these streams have been assigned the same, highest flow priority 106. Although it should be noted that it is not necessarily the case that media streams from the same group member be assigned the same flow priority, as will be demonstrated below. The second group member A2 of the group 100 has one media stream 118 that is assigned a flow priority 108 that is less than the flow priority 106 assigned to the media streams of the first group member.

The group member B1 of the non-critical flow for the critical use group has one media stream 120 that the network operator has assigned a lower flow priority 111 than a normal, but premium, telephony subscriber, such as group member C1 with stream 122. Perhaps this group member B1 is a police cruiser on a routine patrol.

The premium telephony group 104 shows a first group member C1 that has one media stream 122 that is assigned a higher flow priority 108 than a non-critical flow for the critical use group member B1 of group 102. In addition, there is a second group member C2 of the group 104 that has two media streams 124, 126. In this case, each media stream is assigned a different flow priority, media stream 124 is assigned a higher flow priority 108 than a different media stream 126 from the same group member C2 which is assigned a lower flow priority 112. In any event, the members of the telephony group 104 can be assigned flow priorities greater than those of the non-critical flow for the critical use group 102.

It should be recognized that there may be other telephony user groups (silver, bronze, etc.) which would be assigned even lower group and flow priorities than the groups 100, 102, 104 described above.

Figure 2:
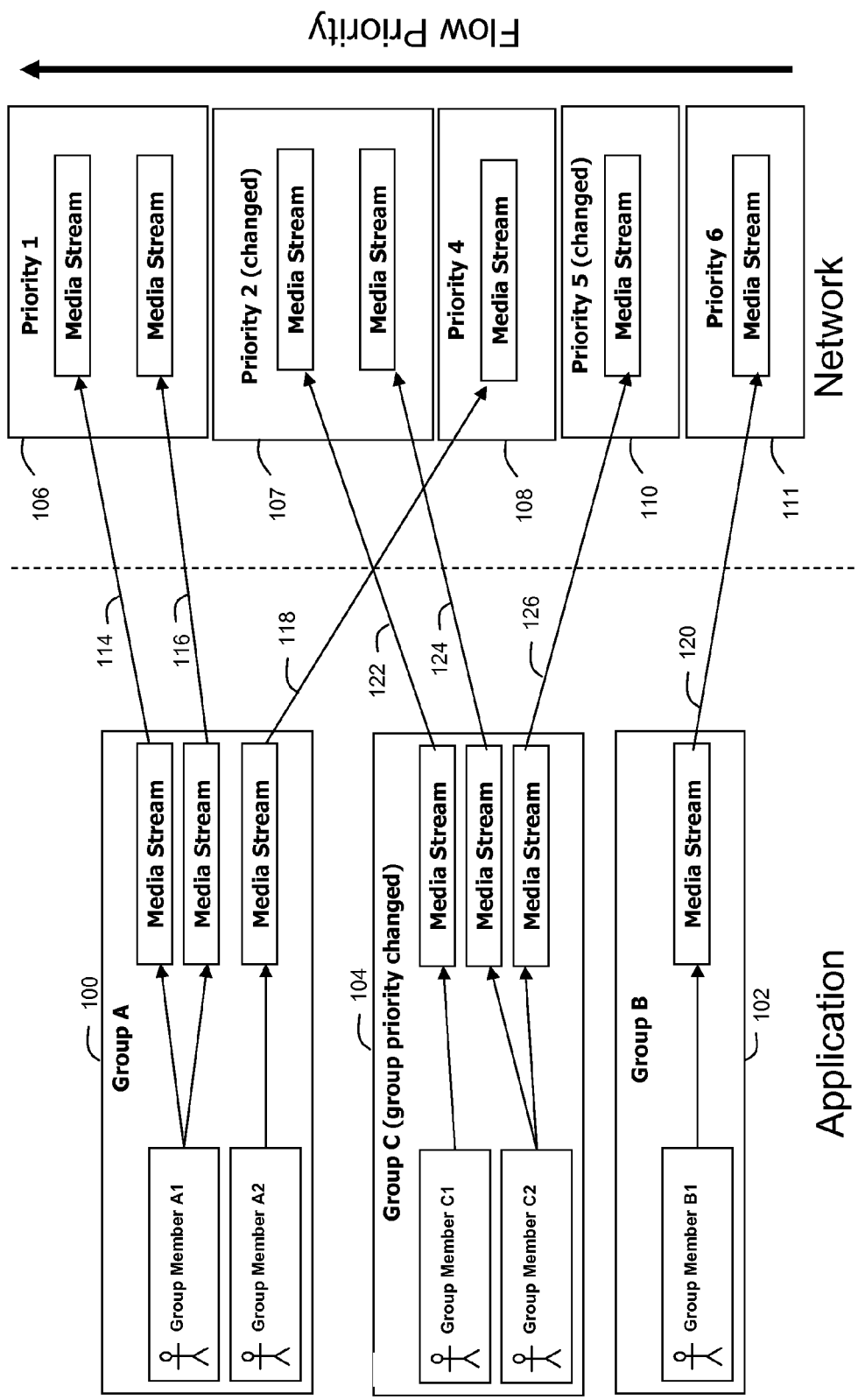
FIG. 2 shows an illustration of group priority flows after a priority change, in accordance with the present invention.

FIG. 2 shows how flow priorities can change dynamically when a group priority changes, in accordance with the present invention. The same three groups are shown using a shared public network; the critical use group 100, the second group 102 consisting of the same critical use group that is not in an emergency situation, i.e. non-critical use, and other normal telephony users of the shared public network, one of which 104 is shown as a subscriber to premium (gold) telephony services. The group members of the first group 100 are still assigned the highest group priority. In addition, each critical media stream 114, 116 from these group members is assigned the highest flow priority 106. For example, the first group member A1 is shown having two media streams 114, 116, such as voice and data for example. In this case, both of these streams have been assigned the same, highest flow priority 106.

In this example, the priority of Group C 104 has changed. For example, this could occur for a business user that has paid for premium service for a conference call at a particular time, i.e. the business user has paid a premium for video services 122, 124 and audio services 126, for example. In such a case, the media streams for Group C will be assigned a higher flow priority. In the example shown, the second group member A2 of the group 100 still has one media stream 118 that is assigned a flow priority 108 that is less than the flow priority 106 assigned to the media streams of the first group member A1. However, some streams 122, 124 of the Group C members C1, C2 now have a higher flow priority 107 than a stream 118 (e.g. text) from a critical use Group member A2, even though Group A has a higher group priority than Group C.

As before, the group member B1 of the non-critical flow for the critical use group has one media stream 120 that the network operator has assigned a lower flow priority 111 than a normal, but premium, telephony subscriber, such as group C. However, stream 126 from group member C2 now has a higher priority 110 than a stream 120 from a non-critical flow member B1, now that Group C has a higher priority than Group B.

The particular flow priorities assigned to different media streams for different groups is predetermined by the network for the different applications/services provided for in the network.

Figure 3:
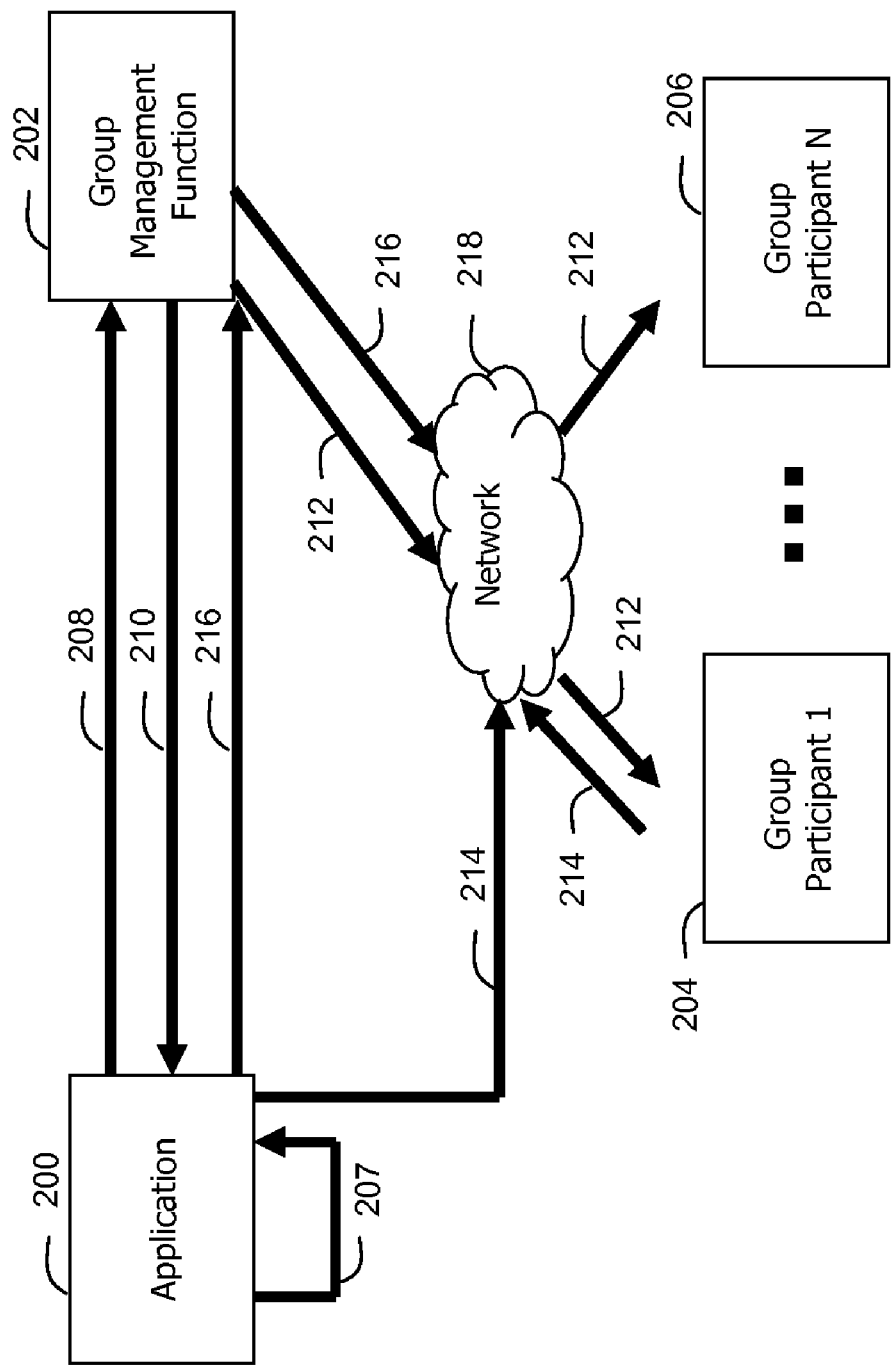
FIG. 3 shows a block diagram of a system, in accordance with the present invention.

FIG. 3 shows a generic work flow in accordance with the present invention. In a first step 207 an application (such as a dispatcher) creates a new group with a dynamic list of participants, 1 through N 204, 206. Participants can consist of users with wired or wireless terminals that support multimedia (e.g. voice, video, messaging). A participant can also be an autonomous terminal (such as a video camera). The application associates an initial priority with the entire group of participants. This priority is defined relative to wired or wireless network resources and it overrides any pre-provisioned priority the group participants have.

In accordance with the present invention, the application requests 208 a Group Management Function (GMF) 202 to allocate a new group identifier for the group participants. In this step 208, the application passes the requested group priority and group participant list to the GMF 202. It should be noted that the GMF 202 may exist as a function in the network or may be external to the network, and can be independent of both the application and the network. In the example herein the GMF is a network element. Specifically, the GMF, may be embodied by: a new function included with the FNE (fixed network equipment), an Open Mobile Alliance XDM Document Management Server (OMA XDM), a new XML tag included with group definition to identify group priority (e.g. changed <qoe> element), or in an Operations and Maintenance Center (OMC) for the network (e.g. AN), which itself can be embodied by a wireless network (LTE, WiMAX FDD&TDD, UMB) or wired network (IP WAN/LAN).

In accordance with the present invention, the GMF 202 responds 210 to the request and supplies the application 200 with an allocated dynamic operator-unique group identifier.

Using in-band signaling, the GMF notifies 212 the network 218 of the new group identifier and group participants and the network 218 uses in-band signaling to notify 212 group participants 204, 206 that they have been added to a group identified by the group identifier. This step may or may not be acknowledged by the group participants and network. Alternatively, using OSI layers 3 and higher, the application can notify group members of the group identifier and group participants can join the group in the network (e.g. RAN multicast group).

In accordance with the present invention, a group participant 204 can originate 214 a new (ingress) flow or the application 200 can originate 214 a new (egress) flow with the network 218. Using in-band signaling, the application 200 or group participant 204 includes the group identifier in the request to initiate a new flow. This allows the network 218 to associate the new flow with the priority of the group and not with the priority of the participant themselves.

In accordance with the present invention, during the life of the group (i.e. as long as the group identifier is active in the GMF 202 and network 218), the application 200 can request 216 the GMF 202 to alter the priority or membership of the group (or other group attributes). The GMF 202 informs 216 the network 218 of the group identifier, new group priority (which affects management of resources within the network) and any added or deleted group participants. This may or may not be acknowledged by the network 218 and GMF 202. The network then assigns flow priorities in accordance with predetermined rules for particular group priorities.

It may be that a group participant 206 was not part of the group original group call, but joins a group that is already in a group call. Any query from this participant 206 is a new flow from the network's perspective and it includes (in-band) the group identifier for the incident. This insures the data query receives priority from the AN. Similarly, the participant 206 may leave the group call, and the application 200 can request the network 218 to remove the participant 206 from the group. The application 200 can also request that the priority for the group be changed, whereupon the network changes the priority of the group and modifies the participant list.

In operation, the present invention defines a group of participants by an application, wherein the group is associated with a priority, and this is communicated from the application to a new Group Management Function (GMF), which assigns a unique identifier to the group, including the group participants and specific media stream flows of the group participants. It should be noted that participants can be added and deleted from the group during the group's lifetime. The application is defined herein as a telecommunication entity (such as a dispatcher) that can communicate with participants using one or more wired or wireless networks. In addition, the group identifier is unique for the entire operator providing the network.

Relative to the network, the priority of the group can be altered higher or lower during the lifetime of the group by the application, wherein the lifetime of the group is the active lifetime of the group identifier as allocated by the GMF. The priority for the group is defined by the application and overrides any participant's provisioned priority (for any participant communication associated with the group).

A group participant may originate a new media stream flow with the network and identify that the flow is part of the group by using in-band signaling which includes the group identifier. A flow is the fundamental entity at the network that can be prioritized (especially over-the-air for wireless networks) relative to all other flows. A flow may contain one or more media streams (audio, video, data, messaging, etc) to/from the group participant or application. The group identifier is allocated by the GMF and allows all flows associated with a group to have a minimum priority at the network. Different flows within the same group can be given higher or lower priority.

An application also may originate a new media stream flow with the network and identify that the flow is part of the group by using in-band signaling which includes the group identifier. In-band signaling is known in the art and is embodied as an extension to QoS authorization using one of the following techniques: a) the 3GPP technique where the group identifier added to Rx Interface (29.211) AAR and RAR procedures, b) the 3GPP2 technique where the group identifier is added to the 'Authorize QoS Resources' procedure, and c) the TISPAN technique where the group identifier is added to Gq' Interface (per ETSI TS 183 017).

In a preferred embodiment, the application can set the priority level of all flows in a group and can change the priority levels in real time.

FIG. 4 shows a flowchart that illustrates a method for dynamic group prioritization in a communication network, in accordance with the present invention. A first step 400 includes defining a list of group participants by an application, such as a dispatcher.

A next step 402 includes sending a request by the application to a Group Management Function (GMF), wherein the request includes a requested group priority and the list of group participants. It should be noted that this step can include a negotiation of requests, responses, and/or acknowledgments.

A next step 404 includes allocating a unique identifier to the group, group participants, and specific media stream flows of the group participants, and assigning a group priority to the group in response to the requested group priority, wherein the unique identifier overrides any pre-provisioned priority of the participants. This step can include either the application or the GMF allocating the unique identifier, whereas the GMF assign the group priority. If the application allocated the identifier, the GMF can choose to accept or reject this allocation. Preferably, this step includes mapping media streams of the group participants to network flows that are treated in accordance with the assigned group priority.

A next step 406 includes notifying the application, group participants, and network of the unique group identifier, and notifying the network of the assigned group priority associated with the unique identifier. The network ultimately will tell the application what the assigned group priority is (which may the request priority or lower)

A next step 408 includes originating a new media stream flow with the network. This can be originated by the application or a member of the list of group participants.

A next step 410 includes indicating that the new flow is part of the group using the unique identifier.

A next step 412 includes associating the new flow with the assigned group priority of the group by the network, in response to the identifier.

During a lifetime of the group when the identifier is still active in the network, the method provides dynamic, real-time changes, which can include a step 414 of requesting the GMF by the application to alter the priority of the group and/or media stream flows within a group, a step 416 of informing the network by the GMF of the group identifier and a new requested group and/or flow priority, and a step of dynamically changing a priority level of media stream flows within a group by the application.

Advantageously, the present invention allows the access network priority level of a group of users (and their associated flows) to be dynamically adjusted in real-time. Within an access network (e.g. LTE), in wired or wireless networking, the present invention dynamically map members of a group with a unique network dynamic identifier and a given dynamic network priority level. The present invention allows an administrator to dynamically modify the priority of a group's network flows associated with a group of users, and allows a group member to originate a new flow, and associate it with the GMF identifier.

Although the preferred embodiment of the present invention is described with reference to access networks in a communication system, it will be appreciated that the inventive concepts hereinbefore described are equally applicable to any wired and wireless communication system.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for dynamic group prioritization in a communication network, the method comprising the step of:
    defining a list of group participants by an application;
    sending a request to a Group Management Function, wherein the request includes a requested group priority and the list of group participants;
    allocating a unique identifier to the group and assigning a group priority to the group in response to the requested group priority; and
    notifying the application, group participants, and the network of the unique identifier, and notifying the network of the assigned group priority associated with the unique identifier.

2. The method of claim 1, further comprising the steps of:
    originating a new media stream flow with the network;
    indicating that the new media stream flow is part of the group using the unique identifier, and
    associating the new media stream flow with the assigned group priority of the group by the network, in response to the identifier.

3. The method of claim 2, wherein the originating step originates with the application.

4. The method of claim 2, wherein the originating step originates with a member of the list of group participants.

5. The method of claim 1, wherein the assigning step overrides any pre-provisioned priority of the participants.

6. The method of claim 1, wherein during a lifetime of the group when the unique identifier is still active in the network, further comprising the steps of:
    requesting the Group Management Function to alter the priority of the group, and
    informing the network of the group identifier and a new requested group priority.

7. The method of claim 1, wherein the assigning step includes mapping media streams of the group participants to network flows that are treated in accordance with the assigned group priority.

8. The method of claim 7, further comprising the step of dynamically changing a priority level of media stream flows within a group by the application.

9. The method of claim 1, further comprising the step of a participant that was not part of an original group call joining a group that is already in a group call, wherein a query from this participant is a new flow that includes the unique group identifier.

10. A method for dynamic group prioritization in a communication network, the method comprising the step of:
    defining a dynamic list of group participants by a dispatcher application;
    sending a request by the application to a Group Management Function, wherein the request includes a requested group priority, the list of group participants, and media stream flows associated with the group participants;
    allocating a unique identifier to the group and assigning a group priority to the group in response to the requested group priority, and mapping the media streams of the group participants to network flows that are treated in accordance with the group priority;
    notifying the application, group participants, and the network of the unique identifier, and notifying the network of the assigned group priority associated with the unique identifier;
    originating a new media stream flow with the network;
    indicating that the new media stream flow is part of the group using the unique identifier, and associating the new media stream flow with the assigned priority of the group by the network, in response to the identifier.

11. The method of claim 10, wherein the originating step originates with one of the application and a member of the list of group participants.

12. The method of claim 10, wherein the assigning step overrides any pre-provisioned priority of the participants.

13. The method of claim 10, wherein during a lifetime of the group when the unique identifier is still active in the network, further comprising the steps of:
   requesting the Group Management Function to alter the priority of the group, and
   informing the network of the group identifier and a new requested group priority.

14. The method of claim 10, further comprising the step of dynamically changing a priority level of media stream flows within a group by the application.

15. The method of claim 10, further comprising the step of a participant that was not part of an original group call joining a group that is already in a group call, wherein a query from this participant is a new flow that includes the unique group identifier.

16. A communication network providing dynamic group prioritization, the communication network comprising:
   an application operable to define a dynamic list of group participants, and send a request including a requested group priority and the list of group participants;
   a Group Management Function operable to receive the request and
   a Group Management Function operable to receive the request, allocate a dynamic unique identifier to the group and assign a group priority to the group in response to the requested group priority, notify the application, group participants, and the network of the unique identifier, and notify the network of the assigned group priority associated with the unique identifier.

* * * * *